(12) United States Patent
Kasahara et al.

(10) Patent No.: US 6,990,200 B1
(45) Date of Patent: Jan. 24, 2006

(54) ENCRYPTION METHOD, CRYPTOGRAPHIC COMMUNICATION METHOD, CIPHERTEXT GENERATING DEVICE AND CRYPTOGRAPHIC COMMUNICATION SYSTEM OF PUBLIC-KEY CRYPTOSYSTEM

(75) Inventors: Masao Kasahara, 15-3, Aogein 4-chome, Mino, Osaka 562-0025 (JP); Yasuyuki Murakami, Kyoto (JP)

(73) Assignees: Murata Machinery Ltd., Kyoto (JP); Masao Kasahara, Osaka (JP)

( * ) Notice: Subject to any disclaimer, the term of this patent is extended or adjusted under 35 U.S.C. 154(b) by 1002 days.

(21) Appl. No.: 09/703,550

(22) Filed: Nov. 1, 2000

(30) Foreign Application Priority Data

Nov. 4, 1999  (JP) ................................. 11-314371
Nov. 4, 1999  (JP) ................................. 11-314372

(51) Int. Cl.
    *H04N 7/167*  (2006.01)

(52) U.S. Cl. ........................... 380/44; 380/28; 380/37; 380/47; 380/210

(58) Field of Classification Search ................ 380/210, 380/47, 44, 37, 28
    See application file for complete search history.

(56) References Cited

U.S. PATENT DOCUMENTS

| 4,316,055 | A | * | 2/1982  | Feistel ........................... 380/37  |
| 4,322,577 | A | * | 3/1982  | Brandstrom ................... 380/37  |
| RE30,957  | E | * | 6/1982  | Feistel ........................... 380/262 |
| 4,520,232 | A | * | 5/1985  | Wilson .......................... 380/28  |
| 5,003,597 | A | * | 3/1991  | Merkle .......................... 380/37  |
| 5,008,935 | A | * | 4/1991  | Roberts ......................... 380/29  |
| 5,148,485 | A | * | 9/1992  | Dent ............................. 380/46  |
| 5,261,003 | A | * | 11/1993 | Matsui .......................... 380/264 |
| 5,412,729 | A | * | 5/1995  | Liu .............................. 380/37  |
| 6,052,466 | A | * | 4/2000  | Wright .......................... 380/262 |

FOREIGN PATENT DOCUMENTS

| JP | 11-173338  | 6/1999 |
| JP | 11-205381  | 7/1999 |
| JP | 11-269407  | 9/1999 |
| JP | 2000-89668 | 3/2000 |
| JP | 2000-89669 | 3/2000 |

* cited by examiner

*Primary Examiner*—Emmanuel L. Moise
*Assistant Examiner*—Paul E. Callahan
(74) *Attorney, Agent, or Firm*—Hogan & Hartson, L.L.P.

(57) ABSTRACT

Two public keys including a random number term therein are prepared in a database for each divided plaintext in advance, a plaintext is divided into a plurality of 1-bit divided plaintexts, one public key is selected for each divided plaintext from the database according to the bit data of each divided plaintext, and the selected public keys are added to generate a ciphertext. This invention bases its security on free selection of a desired combination of public keys.

18 Claims, 5 Drawing Sheets

FIG. 1
PRIOR ART

| CLASS 1 | CLASS 2 | ⋯ | CLASS K |
|---|---|---|---|
| $b_1 v_1^{(1)}$ | $b_1 b_2 v_2^{(1)}$ | ⋯ | $b_1 b_2 \cdots b_K v_K^{(1)}$ |
| $b_1 v_1^{(2)}$ | $b_1 b_2 v_2^{(2)}$ | ⋯ | $b_1 b_2 \cdots b_K v_K^{(2)}$ |
| ⋮ | ⋮ | | ⋮ |
| $b_1 v_1^{(J)}$ | $b_1 b_2 v_2^{(J)}$ | ⋯ | $b_1 b_2 \cdots b_K v_K^{(J)}$ |

FIG. 3

| CLASS 1 | CLASS 2 | CLASS 3 | ... | CLASS K |
|---|---|---|---|---|
| $v_1^{(0)} w_1$ | $2 v_2^{(0)} w_1$ | $2^2 v_3^{(0)} w_1$ | ... | $2^{K-1} v_K^{(0)} w_1$ |
| $v_1^{(1)} w_1$ | $2 v_2^{(1)} w_1$ | $2^2 v_3^{(1)} w_1$ | ... | $2^{K-1} v_K^{(1)} w_1$ |

ENCRYPTION METHOD, CRYPTOGRAPHIC COMMUNICATION METHOD, CIPHERTEXT GENERATING DEVICE AND CRYPTOGRAPHIC COMMUNICATION SYSTEM OF PUBLIC-KEY CRYPTOSYSTEM

BACKGROUND OF THE INVENTION

The present invention relates to a public-key cryptosystem encryption method and ciphertext generating device for transforming a plaintext into a ciphertext by using a public key, a cryptographic communication method and cryptographic communication system using this encryption method, and a memory product/data signal embodied in carrier wave for recording/transmitting operation programs for these methods.

In the modern society, called a highly information-oriented society, based on a computer network, important business documents and image information are transmitted and communicated in a form of electronic information. Such electronic information can be easily copied, so that it tends to be difficult to discriminate its copy and original from each other, thus bringing about an important issue of data integrity. In particular, it is indispensable for establishment of a highly information oriented society to implement such a computer network that meets the factors of "sharing of computer resources," "multi-accessing," and "globalization," which however includes various factors contradicting the problem of data integrity among the parties concerned. In an attempt to eliminate those contradictions, encrypting technologies which have been mainly used in the past military and diplomatic fields in the human history are attracting world attention as an effective method for that purpose.

A cipher is defined as exchanging information in such a manner that no one other than the parties concerned can understand the meaning of the information. In the field of ciphers, encryption is defined as converting an original text (plaintext) that can be understood by anyone into a text (ciphertext) that cannot be understood by the third party and decryption is defined as restoring a ciphertext into a plaintext, and cryptosystem is defined as the overall processes covering both encryption and decryption. The encrypting and decrypting processes use secret information called an encryption key and a decryption key, respectively. Since the secret decryption key is necessary in decryption, only those knowing this decryption key can decrypt ciphertexts, thus maintaining data security.

The encryption scheme is roughly classified into two types: common-key cryptosystem and public-key cryptosystem. In a common-key cryptosystem, an encryption key and a decryption key are identical with each other, and a sender and a recipient perform cryptographic communications by possessing an identical common key. The sender encrypts a plaintext based on a secret common key and transmits the resultant ciphertext to the recipient, and then the recipient decrypts the ciphertext into the original plaintext by using this common key.

On the other hand, in a public-key cryptosystem, an encryption key and a decryption key are different from each other, and cryptographic communications are performed by encrypting a plaintext by the sender with the use of a publicized public key of the recipient and decrypting the resultant ciphertext by the recipient with the use of its own secret key. The public key is a key used for encryption and the secret key is a key used for decrypting the ciphertext transformed by the public key, and the ciphertext transformed by the public key can be decrypted only by the secret key.

As one scheme of public-key cryptosystem, a product-sum type encryption scheme has been known. In this encryption scheme, the sender as one of entities generates ciphertext $C = m_1 c_1 = m_2 c_2 = \ldots + m_K c_K$ by using plaintext vector $m = (m_1, m_2, \ldots, m_K)$ obtained by dividing plaintext into K pieces and base vector $c = (c_1, c_2, \ldots, c_K)$ as a public key, and the recipient as the other entity decrypts the ciphertext C into the plaintext vector m by using a secret key to obtain the original plaintext.

Regarding the product-sum type cryptosystem using an operation on an integer ring, new schemes and attacking methods have been proposed one after another. In particular, development of encryption/decryption techniques capable of performing high-speed decryption has been desired so as to process a large quantity of information in a short time. Then, the present inventors proposed an encryption method and decryption method of the product-sum type cryptosystem, which enable high-speed decryption processing by expressing plaintext by using multi-adic numbers (Japanese Patent Application Laid-Open Nos. 2000-89668 and 2000-89669).

The following description will explain the encryption method and decryption method proposed in Japanese Patent Application Laid-Open No. 2000-89668 (hereinafter referred to as the "first conventional example"). The secret and public keys are prepared as follows.

Secret key: $\{b_i\}$, $\{v_i\}$, P, w
Public key: $\{c_i\}$

By multiplying a base-product $b_1 b_2 \ldots b_i$ by a random number term $v_i$, a base $B_i$ is given as shown by (1) below.

$$B_i = v_i b_1 b_2 \ldots b_i \qquad (1)$$

Here, $v_i$ is set so that each $B_i$ expressed by equation (1) has an almost equal size. However, the condition $\gcd(v_i, b_{i=1}) = 1$ must be satisfied.

With the use of a random number w, the public key $\{c_i\}$ is found as shown by (2) below.

$$c_i \equiv w B_i \pmod{P} \qquad (2)$$

By performing the product-sum operation of messages $\{m_i\}$ obtained by dividing the plaintext into K pieces and the public keys $\{c_i\}$, the ciphertext C is obtained as shown by (3) below.

$$C = m_1 c_1 + m_2 c_2 + \ldots + m_K c_K \qquad (3)$$

Decryption processing is carried out as follows.
For the ciphertext C, an intermediate decrypted text M is found as shown by (4) below.

$$M \equiv w^{-1} C \pmod{P} \qquad (4)$$

This intermediate decrypted text M is specifically given as equation (5), and it can be decrypted by a sequential decryption algorithm shown below.

$$M = m_1 b_1 v_1 + m_2 b_1 b_2 v_2 + \ldots + m_K b_1 b_2 \ldots b_K v_K \qquad (5)$$

[Sequential Decryption Algorithm]
Step 1

$$M_1 = M / b_1$$

$$m_1 = M_1 v_1^{-1} \pmod{b_2}$$

Step i (i=2 to K−1)

$$M_1 = (M_{i-1} - m_{i-1} v_{i-1}) / b_1$$

$$m_1 = M_i v_i^{-1} \pmod{b_{i+1}}$$

Step K $$M_K = (M_{K-1} - m_{K-1} v_{K-1})/b_K$$

$$m_K = M_K / v_K$$

Originally, such a public-key encryption scheme bases its security on the difficulty of factoring and the difficulty of solving a discrete logarithm problem, and various attacks against it have been proposed.

Moreover, the present inventors proposed a new type of public-key cryptosystem encryption method which bases its security on such a point that a set of public keys can be freely selected among a very large number of combinations of public keys (Japanese Patent Application No. 11-269407/1999, hereinafter referred to as the "second conventional example"). This scheme is a modified scheme of the above-mentioned first conventional example. In this scheme, a plurality of public keys produced from the products of integers and random number terms are prepared in advance for each divided plaintext obtained by dividing a plaintext, an arbitrary public key is selected for each divided plaintext among these prepared public keys, and a ciphertext is generated by using the selected public keys. The following description will explain the encryption method and decryption method proposed in this second conventional example.

The intermediate decryped text M during the first transfer by the encryption scheme of the second conventional example based on the scheme of the first conventional example is given by (6) below.

$$M = m_1' b_1 v_1 + m_2' b_1 b_2 v_2 + \ldots + m_K' b_1 b_2 \ldots b_K v_K \quad (6)$$

However, $m_1'$ is encoded to establish (7) below module J for j given by adding $\log_2$ J-bit redundancy to message (divided plaintext) $m_1$, and the information indicating which public key among later-described plurality of public keys is to be selected for each divided plaintext is transmitted.

$$m_i' \equiv j \pmod{J} \quad (7)$$

FIG. 1 is an illustration showing a public key list indicating a plurality of public keys prepared for each divided plaintext. In FIG. 1, K represents a dividing number (class number) of plaintext. As illustrated in FIG. 1, the set $\{b_1 b_2 \ldots b_i v_i^{(j)}\}$ provided by multiplying the base-product by a random number term is prepared as J pieces of public keys for each divided plaintext (each class).

An entity as the recipient transforms these products of the base-product and random number term by a random number w and publicizes them. In other words, the products of the base-product and random number term shown in FIG. 1 are transformed as shown by (8) below, and the set $\{c_{ij}\}$ thereof is publicized.

$$b_1 b_1 \ldots b_i v_i^{(j)} w \equiv c_{ij} \pmod{P} \quad (8)$$

A set of public keys which is randomly selected by an entity as the sender is expressed as shown by (9) below. In this case, it is possible for the entity as the sender to select public keys in $J^K (\gg 1)$ ways.

[Eq. 1]

$$(c_1, j_1, c_2, j_2, \ldots, c_K, j_K) \quad (9)$$

According to a set of the selected public keys shown in (9) above, the entity as the sender lets $m_i' \equiv j_i \pmod{J}$, and then generates the ciphertext C to the entity as the recipient as shown by (10) below.

[Eq. 2]

$$C = m_1' c_{1, j_1} + m_2' c_{2, j_2} + \ldots + m_K' c_{K, j_K} \quad (10)$$

In order to decrypt the ciphertext C thus generated, the entity as the recipient predetermines the random number term $v_i^{(j)}$ of FIG. 1 as shown by (11) below.

$$v_i^{(j)} = w_{b,i} + r_i^{(j)} b_{i+1} \quad (11)$$

where each of $w_{b,i}$, $r_i^{(j)}$ is a random number.

Further, the entity as the recipient has $w_{b,i}^{-1}$ that satisfies (12) below as a secret key.

$$w_{b,i} w_{b,i}^{-1} \equiv 1 \pmod{b_{i+1}} \quad (12)$$

The decryption processing by the entity as the recipient is carried out as follows. An intermediate decrypted text $M_0$ is given as shown by (13) below.

[Eq. 3]

$$M_0 = m_1' b_1 v_1^{(j_1)} + m_2' b_1 b_2 v_2^{(j_2)} + \ldots + m_K' b_1 b_2 \ldots b_K v_K^{(j_K)} \quad (13)$$

Therefore, decryption can be performed by the sequential decryption algorithm shown in (14) below. Incidentally, in (14), although $b_{K+1}$ is a random number satisfying $m_K' < b_{K+i}$, it is not used as a base. In general, the random number term for $j_i$ in step i is expressed as shown by (15) below.

[Eq. 4] Sequential Decryption Algorithm $$\left. \begin{array}{l} \text{Step 1} \\ M_1 = \dfrac{M_0}{b_1} \\ m_1' \equiv M_1 \cdot w_{b,i}^{-1} \pmod{b_2} \\ m_1' \equiv j_i \pmod{J} \\ \text{Step } i \quad (i = 2 \text{ to } K - 1) \\ M_i = \dfrac{M_{i-1} - m_{i-1}' v_{i-1}^{(j_{i-1})}}{b_i} \\ m_i' \equiv M_i w_{b,i}^{-1} \pmod{b_{i+1}} \\ m_i' \equiv j_i \pmod{J} \\ \text{Step } K \\ M_K = \dfrac{M_{K-1} - m_{K-1}' v_{K-1}^{(j_{K-1})}}{b_K} \\ m_K' \equiv M_i w_{b,K}^{-1} \pmod{b_{K+1}} \end{array} \right\} \quad (14)$$

$$v^{(j_i)} \quad (15)$$

In the decryption method proposed in the above-described second conventional example, since public keys are arbitrarily selected, i.e., since the entity as the sender freely selects public keys and generates ciphertext, the selection pattern of the public keys is unknown to attackers, and thus making it difficult to attack. Besides, the present inventors are further researching on a more practical encryption method.

BRIEF SUMMARY OF THE INVENTION

An object of the present invention is to provide a public-key cryptosystem encryption method, cryptographic communication method, ciphertext generating device and cryptographic communication system which are capable of achieving high-speed processing while ensuring security by free selection of public keys, and a memory product/data signal embodied in carrier wave for recording/transmitting operation programs for these methods.

According to a first aspect of the present invention, two public keys including a random number term therein are prepared for each divided plaintext in advance, a plaintext to be encrypted is divided into a plurality of 1-bit divided plaintexts, one public key is selected for each divided plaintext among the two public keys prepared, according to a bit pattern of the plurality of divided plaintexts, and a ciphertext is generated by using the plurality of divided plaintexts and selected public keys. In the encryption method proposed in the above-mentioned second conventional example, this first aspect limits the divided plaintexts to one bit and restrains the number of rows in the public key list to two rows (J=2). It is therefore possible to perform encryption and decryption processing at extremely high speeds. However, with the simple addition of such limitations, since a public key of the first row is selected when $m_i=0$ and a public key of the second row is selected when $m_i=1$, a 0, 1-knapsack cryptosystem with an extremely low level of security will result. Then, with the first aspect, the ciphertext is generated by determining which public key is to be selected for each divided plaintext, according to a bit pattern of a plurality of divided plaintexts. Hence, unlike the 0, 1-knapsack cryptosystem, high security is achieved.

According to a second aspect of the present invention, $2^s$ public keys including a random number term therein are prepared for each divided plaintext in advance, a plaintext to be encrypted is divided into a plurality of s-bit divided plaintexts, one public key is selected for each divided plaintext among the $2^s$ public keys prepared, according to the bit data of each divided plaintext, and a ciphertext is generated by using the selected public keys. For example, when s=1, two public keys including a random number term therein (a public key list with two upper and lower rows) are prepared for each divided plaintext, one of the public keys is selected according to the bit data ("0", "1") of each divided plaintext, and all the selected public keys are added to generate the ciphertext. At this time, as an example, when the plaintext is "0", the public key of the upper row is selected, while when the plaintext is "1", the public key of the lower row is selected. With the second aspect, the ciphertext is generated simply by adding the public keys including a random number term therein, which are selected according to the bit data, and the encryption and decryption processing becomes extremely fast. The bit data of each divided plaintext used as a criterion to select a public key is unknown to the attackers and the selection pattern of the public keys can never be known, thereby achieving high security.

With the present invention, it is possible to achieve high-speed encryption/decryption processing while ensuring security by free selection of public keys, and the present invention can largely contribute to the development and realization of practical use of public-key encryption schemes.

The above and further objects and features of the invention will more fully be apparent from the following detailed description with accompanying drawings.

BRIEF DESCRIPTION OF THE SEVERAL VIEWS OF THE DRAWINGS

FIG. 1 is an illustration showing a public key list according to an encryption scheme of the second conventional example, FIG. 3 is an illustration showing a public key list in a database according to the present invention.

DETAILED DESCRIPTION OF THE INVENTION

The present invention will be described below with reference to the drawings illustrating the embodiments thereof.

First Embodiment

The following description will explain a first embodiment in which a public key is selected according to a bit pattern of a plurality of divided plaintexts.

Figure 2:
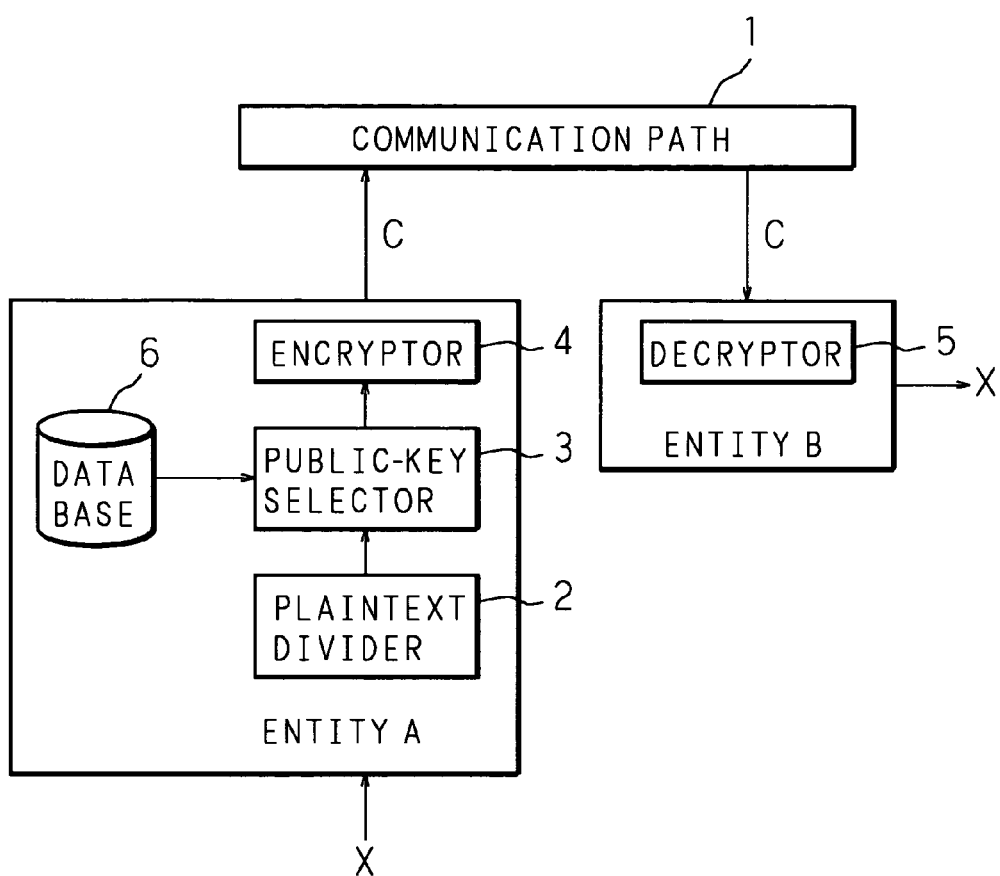
FIG. 2 is a depiction showing a state of cryptographic communications of information between two entities according to a first embodiment.

FIG. 2 is a depiction showing a state in which an encryption scheme according to the first embodiment (first aspect) is used for information communications between entities A and B. The example shown in FIG. 2 illustrates a case where one of the entities, A, encrypts a plaintext X into a ciphertext C and transmits the ciphertext C to the other entity, B, via a communication path 1, and the entity B decrypts the ciphertext C into the original plaintext X.

The entity A as the sender is provided with a plaintext divider 2 for dividing the plaintext X into a plurality of 1-bit divided plaintexts, a public-key selector 3 for selecting a public key for each divided plaintext from a database 6 storing a public key list as described later, and an encryptor 4 for generating the ciphertext C by using the selected public keys and respective divided plaintexts. Besides, the entity B as the recipient is provided with a decryptor 5 for decrypting the transmitted ciphertext C into the original plaintext X. In this example, the issuer of the public key list is the entity B as the recipient, and the user of this public key list is the entity A as the sender.

Next, a specific technique will be explained. FIG. 3 is an illustration showing the public key list in the database 6 that stores a plurality of public keys for each divided plaintext in advance. FIG. 3 shows a public key list in accordance with the supposition that a public key for each divided plaintext is constructed by modular transformation by $(w_1, P_1)$. In FIG. 3, K represents a dividing number (class number) of the plaintext X, two (upper row, lower row) public keys including a random number term therein are prepared for each of K pieces of divided plaintexts (for each class).

In the encryption method proposed in the second conventional example, when $m_i=0$, the component $v_i^{(0)}$ of the upper row of the public key list of FIG. 3 is selected, while when $m_i=1$, the component $v_i^{(1)}$ of the lower row is selected. Thus, when the technique is simply applied to the encryption method of the second conventional example, a 0, 1-knapsack cryptosystem with an extremely low level of security will result.

Then, in the first embodiment, it is determined which row of the public keys in the public key list is to be selected for each divided plaintext, according to a bit pattern of a plurality of divided plaintexts. In other words, after dividing the plaintext X into K pieces of 1-bit divided plaintexts, selection information $(x_1, x_2, \ldots, x_K)$ indicating which row of the public keys is to be selected is determined for each divided plaintext, according to a bit pattern of the K pieces of divided plaintexts $(m_1, m_2, \ldots, m_K)$. An algorithm for pre-coding the divided plaintexts to the selection information is as follows.

[Pre-coding Algorithm]
Step 1
$x_1=0$, i.e., the upper row is selected.
Step i (i=2 to K−1)
When $m_{i-1}=0$, $x_i$ selects the same row as $x_{i-1}$.
When $m_{i-1}=1$, $x_i$ selects a row different from $x_{i-1}$.

For example, when the divided plaintexts are $(m_1, m_2, m_3, m_4, m_5)=(0, 1, 0, 1, 0)$, if the selection of the upper row is represented by 0 and the selection of the lower row is represented by 1, the precoded selection information of the upper and lower rows is $(x_1, x_2, x_3, x_4, x_5)=(0, 0, 1, 1, 0)$.

The entity A generates the ciphertext C to the entity B as shown by (16) below, based on a set of public keys selected according to the bit pattern of a plurality of divided plaintexts.

$$C = m_1 v_i^{(t1)} w_1 + m_2 2 v_2^{(t2)} w_1 + \ldots + m_K 2^{K-1} v_K^{(tK)} w_1 \quad (16)$$

(t1, t2, . . . , tK=0 or 1)

For example, when the divided plaintext are $(m_1, m_2, m_3, m_4, m_5)=(0, 1, 0, 1, 0)$, since the selection information of the upper and lower rows of the public keys is $(x_1, x_2, x_3, x_4, x_5)=(0, 0, 1, 1, 0)$, the ciphertext C is concretely given as shown by (17) below.

$$C = 2v_2^{(0)} w_1 + 2^3 v_4^{(1)} w_1 \quad (17)$$

The ciphertext C thus generated is transmitted from the entity A to the entity B via the communication path 1. Then, the ciphertext C is decrypted into the original plaintext X by the entity B.

The decryption processing by the decryptor 5 of the entity B is carried out as follows.

An intermediate decrypted text $M_1$ found as shown by (18) below.

$$M_1 \equiv C \cdot w_1^{-1} (\bmod P_1) \quad (18)$$

Let the selection information of the upper and lower rows be $x_1=0$.

Next, with the use of the component $v_1^{(0)}$ of the upper row, $m_1$ is found as shown by (19) below.

$$m_1 \equiv M_1 \cdot (v_1^{(0)})^{-1} (\bmod 2) \quad (19)$$

The next intermediate decrypted text $M_2$ is found as shown by (20) below.

$$M_2 = M_1 - m_1 v_i^{(0)} \quad (20)$$

Supposing that $x_2 = x_1$ xor $m_1$, the next selection information $x_2$ is found.

Then, by considering that the upper row is selected when $x_2=0$ and the lower row is selected when $x_2=1$, $m_2$ is found as shown by (21) below.

$$m_2 \equiv M_2 \cdot (v_2^{(x2)})^{-1} (\bmod 2) \quad (21)$$

Thereafter, in the same manner as for $m_2$, the remaining $m_3, \ldots, m_K$ are decrypted.

In the first embodiment as described above, the first base-product $v_1^{(1)} w_1$ in the lower row of FIG. 3 is not used for decryption of the pre-coding. Since the number of rows in the public key list is 2 rows (J=2), in the first embodiment, the length of the input plaintext becomes twice longer, but the weight index=(average weight)/(concatenate plaintext length)=¼.

Incidentally, the above-described algorithm for pre-coding divided plaintexts to selection information is merely an example and, needless to say, it is possible to use another example of algorithm for determining the selection information of public keys according to the bit pattern of a plurality of divided plaintexts.

The following description will explain examples of the application of the first embodiment that achieve improved security.

(Application of Multi-Stage Encryption)

This is the application of the encryption method (the concept of multi-stage encryption) proposed in Japanese Patent Application No. 11-173338/1999 by the present inventors to the above-described encryption method, in which application ciphertext is generated by using the result of operating multi-stage modular-transformation by a plurality of random numbers on a public key selected for each divided plaintext. With respect to a base-product shown in FIG. 3, a plurality of sets (S sets) of a pair (w, P) of random number w and prime number P are set, multiplication by the random numbers are performed over S stages, and the result is used as a public key. Hence, by applying the multi-stage encryption technique to the basic encryption scheme of the first embodiment, it is possible to establish a scheme that achieves higher security.

(Application of Product-Sum-Product Encryption)

This is the application of the encryption method (the concept of product-sum-product encryption) proposed in Japanese Patent Application No. 11-205381/1999 by the present inventors to the above-described encryption method, in which application ciphertext is generated by setting a plurality of product-sum terms of the divided plaintexts and public keys selected for each divided plaintext and combining the plurality of the product-sum terms in the forms of product or sum. A part of divided plaintexts obtained by dividing plaintext and public keys selected for each of that part of the divided plaintexts are used to generate plural sets of product-sum terms as shown by (16) above, and multiplication and/or addition of the generated plural sets of the product-sum terms are further performed to generate ciphertext. Thus, by applying the product-sum-product encryption technique to the basic encryption scheme of the first embodiment, it is possible to establish a scheme that achieves higher security.

As described in detail above, in the first embodiment, two public keys are prepared for each divided plaintext in advance, a plaintext to be encrypted is divided into a plurality of 1-bit divided plaintexts, one public key is selected among the two public keys prepared for each divided plaintext, according to a bit pattern of the plurality of divided plaintexts, and a ciphertext is generated by using the plurality of divided plaintexts and selected public keys. It is therefore possible to achieve high-speed encryption/decryption processing while ensuring security by free selection of public keys and to foster the development and practical use of the public-key encryption scheme.

Second Embodiment

The following description will explain a second embodiment in which public keys are selected according to the bit data of a plurality of divided plaintexts.

Figure 4:
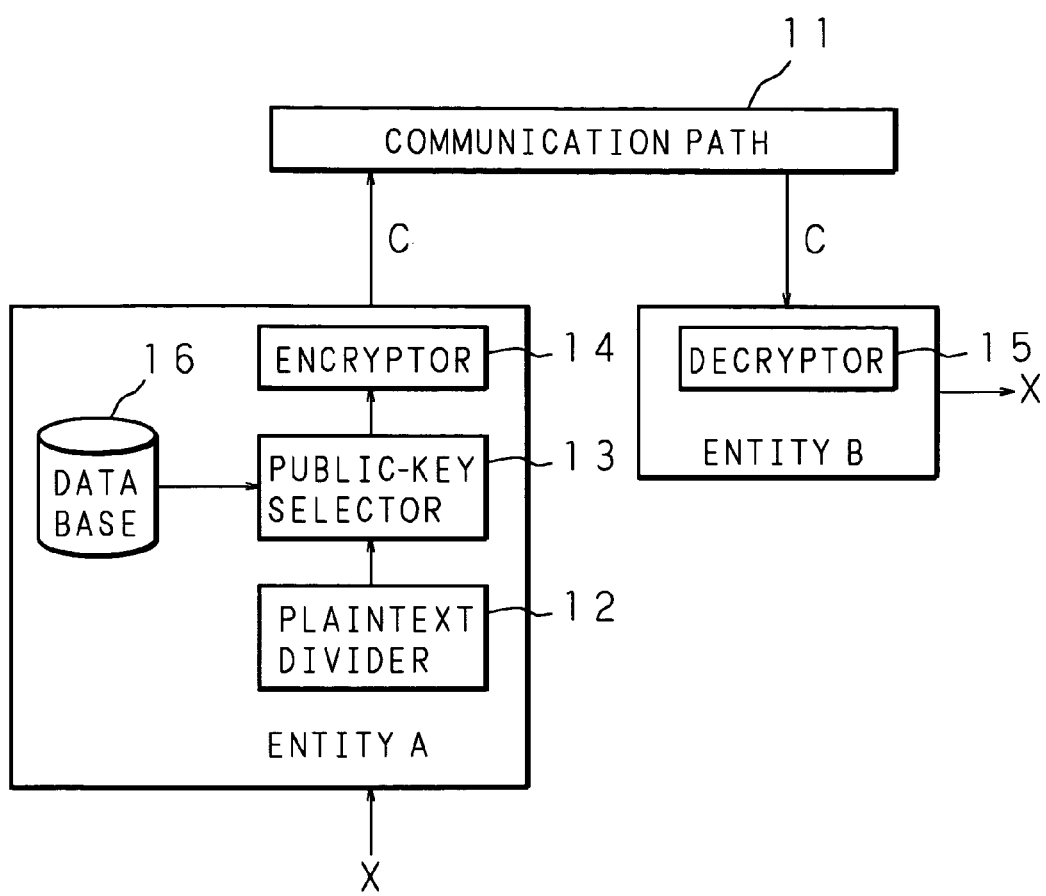
FIG. 4 is a depiction showing a state of cryptographic communications of information between two entities according to a second embodiment.

FIG. 4 is a depiction showing a state in which an encryption scheme according to the second embodiment (second aspect) is used for information communications between the entities A and B. Like FIG. 2, the example shown in FIG. 4 illustrates a case where one of the entities, A, encrypts a plaintext X into a ciphertext C and transmits the ciphertext C to the other entity, B, via a communication path 11, and the entity B decrypts the ciphertext C into the original plaintext X.

The entity A as the sender is provided with a plaintext divider 12 for dividing the plaintext X into a plurality of divided plaintexts, a public-key selector 13 for selecting a public key for each divided plaintext from a database 16 storing a public key list, and an encryptor 14 for generating the ciphertext C by using the selected public keys. Besides, the entity B as the recipient is provided with a decryptor 15 for decrypting the transmitted ciphertext C into the original plaintext X. In this example, the issuer of the public key list is the entity B as the recipient, and the user of this public key list is the entity A as the sender.

Next, a specific technique will be explained. Note that the following explanation is given by illustrating an example in which s=1, i.e., each divided plaintext is one bit and two public keys are provided for selection with respect to each divided plaintext. FIG. 3 is an illustration showing the public key list in the database 16 that stores two public keys for each divided plaintext in advance. FIG. 3 shows a public key list in accordance with the supposition that a public key for each divided plaintext is constructed by modular transformation by $(w_1, P_1)$. In FIG. 3, K represents a dividing number (class number) of the plaintext X, two (upper row, lower row) public keys including a random number term therein are prepared for each of K pieces of divided plaintexts (for each class). Besides, the random number $v_i^{(0)}$ and random number $v_i^{(1)}$ in FIG. 3 satisfy (22) and (23) below, respectively.

$$v_i^{(0)} \equiv 0 (\bmod 2) \quad (22)$$

$$v_i^{(1)} \equiv 0 (\bmod 2) \quad (23)$$

After dividing the plaintext X into K pieces of 1-bit divided plaintexts, the entity A selects a public key according to the bit data of each of the divided plaintexts. In other words, when the divided plaintext is $m_i=0$, a public key of the upper row, i.e., the base-product $2^{i-1}v_i^{(0)}$, is selected, while when the divided plaintext is $m_i=1$, a public key of the lower row, i.e., the base-product $2^{i-1}v_i^{(1)}$, is selected. By sequentially adding the selected public keys, the ciphertext C to the entity B is generated as shown by (24) below.

$$C = v_1^{(t1)}w_1 + 2v_2^{(t2)}w_1 + \ldots + 2^{K-1}v_K^{(tK)}w_1$$

$$(t1, t2, \ldots, tK = 0 \text{ or } 1) \quad (24)$$

For example, when the divided plaintexts are $(m_1, m_2, m_3, m_4, m_5)=(0, 1, 0, 1, 0)$, the ciphertext C to the entity B is generated as shown by (25) below.

$$C = v_1^{(0)}w_1 + 2v_2^{(1)}w_1 + 2^2 v_3^{(0)}w_1 + 2^3 v_4^{(1)}w_1 + 2^4 v_5^{(0)}w_1 \quad (25)$$

The ciphertext C thus generated is transmitted from the entity A to the entity B via the communication path 11. Then, the ciphertext C is decrypted into the original plaintext X by the entity B.

The decryption processing by the decryptor 15 of the entity B is carried out as follows.

An intermediate decrypted text $M_1$ is found as shown by (26) below.

$$M_1 = C \cdot w_1^{-1} (\bmod P_1) \quad (26)$$

Here, it is apparent that the intermediate decrypted text $M_1$ is expressed as shown by (27) below. Here, however, (28) shown below must be satisfied.

[Eq. 5]

$$M_1 + v_1^{(m1)} + 2v_2^{(m2)} + 2^2 v_3^{(m3)} \ldots + 2^{K-1}v_K^{(mK)} \quad (27)$$

$$|2^{i-1}v_i^{(mi)}| \geq K+64 \quad (28)$$

Therefore, decryption can be performed by a decryption algorithm shown in (29) below. It will be appreciated that this decryption algorithm is extremely simplified.

[Eq. 6] Decryption Algorithm $$\left. \begin{array}{l} \text{Step 1} \\ \text{when } M_1 \equiv 0 \ (\bmod \ 2), \text{ decryption of } m_1 = 0 \\ \text{when } M_1 \equiv 1 \ (\bmod \ 2), \text{ decryption of } m_1 = 1 \\ \text{Step } i \ (i=2 \text{ to } K) \\ M_i = \dfrac{M_{i-1} - v_{i-1}^{(m_{i-1})}}{2} \\ \text{when } M_1 \equiv 0 \ (\bmod \ 2), \text{ decryption of } m_1 = 0 \\ \text{when } M_1 \equiv 1 \ (\bmod \ 2), \text{ decryption of } m_1 = 1 \end{array} \right\} \quad (29)$$

The following description will explain the characteristics of the encryption scheme of the second embodiment by mainly discussing the comparison between this encryption scheme and a 0, 1-knapsack cryptosystem which is very close to this. There is a notable difference between the encryption scheme of the second embodiment and the conventional knapsack cryptosystem in that the encryption scheme of the second embodiment does not have $\Sigma m_i c_i$ form, i.e., is not of product-sum type but is of addition type.

In the scheme of the second embodiment, the weight index=½ for the concatenate plaintext. For this sense, it would be considered that the scheme of the second embodiment is strengthened against concatenate attacks. The scheme of the second embodiment has the following significant characteristics in comparison with the conventional 0, 1-knapsack cryptosystem.

In the scheme of the second embodiment, as the sum of ciphertext C shown in (30) below based on the public keys $(c_1, c_2, \ldots, c_K)$ corresponding to the upper row of FIG. 3 and ciphertext C' shown in (31) below based on the public keys $(c_1', c_2', \ldots, c_K')$ corresponding to the lower row of FIG. 3, ciphertext $C^s$ is given as shown by (32) below.

[Eq. 7]

$$C = \Sigma \overline{m_i} c_i \quad (30)$$

$$C = \Sigma m_i c_i \quad (31)$$

$$C^S = C + C' \quad (32)$$

For example, when the divided plaintexts are $(m_1, m_2, m_3, m_4, m_5)=(0, 1, 1, 0, 1)$, the ciphertext C and ciphertext C' are given as shown by (33) and (34) below, respectively.

[Eq. 8]

$$C = \overline{m_1}c_1 + \overline{m_4}c_4 \quad (33)$$

$$C' = m_2 c'_2 + m_3 c'_3 + m_5 c'_5 \quad (34)$$

The ciphertext C and ciphertext C' are generated by multi-stage encryption, and designed to achieve higher security by different random numbers $\{v_i\}$, $\{v_i'\}$, respectively. The ciphertext $C^s$ according to the scheme of the second embodiment is given as the sum of two apparently different ciphertexts of the knapsack cryptosystem. For this sense, is should be considered that a breakthrough was made in the 0, 1-knapsack cryptosystem. Regarding the LLL (Lenstra-Lenstra-Lovasz) attack, it is considered that it is extremely difficult for the attacker to attack since (the input plaintext lengh)/(ciphertext)=2 is satisfied.

The following description will explain examples of the application of the second embodiment that achieve improved security.

(Application of Multi-Stage Encryption)

This is the application of the encryption method (the concept of multi-stage encryption) proposed in Japanese Patent Application No. 11-173338/1999 by the present inventors to the above-described encryption method, in which application ciphertext is generated by using the result of operating multi-stage modular-transformation by a plurality of random numbers on a public key selected for each divided plaintext. With respect to a base-product shown in FIG. 3, a plurality of sets (S sets) of a pair (w, P) of random number w and prime number P are set, multiplication by the random numbers are performed over S stages, and the result is used as a public key. Hence, by applying the multi-stage encryption technique to the basic encryption scheme of the second embodiment, it is possible to establish a scheme that achieves higher security.

(Application of Product-Sum-Product Encryption)

This is the application of the encryption method (the concept of product-sum-product encryption) proposed in Japanese Patent Application No. 11-205381/1999 by the present inventors to the above-described encryption method, in which application ciphertext is generated by setting a plurality of sum terms obtained by adding a plurality of selected public keys and combining a plurality of the sum terms in the form of product and/or sum. Plural sets of sum terms as shown by (24) above are generated with the use of a plurality of public keys selected according to the bit data of each divided plaintext, and multiplication and/or addition of the generated plural sets of the sum terms are further performed to generate ciphertext. Thus, by applying the product-sum-product encryption technique to the basic encryption scheme of the second embodiment, it is possible to establish a scheme that achieves higher security.

Incidentally, in the above-described example, while the case where two public keys are provided for selection with respect to each divided plaintext (s=1) has been explained, it is possible to expand the application to the case where $b_i = 2^s$ (s: natural number no less than 2) by using a random number as shown by (36) below that satisfies (35) below. For example, when s=2, four public keys are prepared for each divided plaintext, a plaintext is divided into 2-bit divided plaintexts, one public key is selected for each divided plaintext among the four public keys according to the bit data of each divided plaintext, and a ciphertext is generated in the form of sum of all of the selected public keys.

[Eq. 9]

$$v_i^{(mi)} = m \pmod{2^s} \tag{35}$$

$$v_i^{(mi)} \tag{36}$$

As described in detail above, in the second embodiment, $2^s$ public keys including a random number term therein are prepared for each divided plaintext in advance, a plaintext to be encrypted is divided into a plurality of s-bit divided plaintexts, one public key is selected for each divided plaintext among the $2^s$ public keys prepared for each divided plaintext, according to the bit data of each divided plaintext, and a ciphertext is generated by using the selected public keys. It is therefore possible to achieve high-speed encryption/decryption processing while ensuring security by free selection of public keys and to foster the development and practical use of the public-key encryption scheme.

Further, while the above-described examples are illustrated for the cryptographic communication system, needless to say, it is possible to apply the encryption methods of the first and second embodiments of the present invention to the case where a ciphertext is by encrypting a plaintext and the generated ciphertext is simply recorded.

Figure 5:
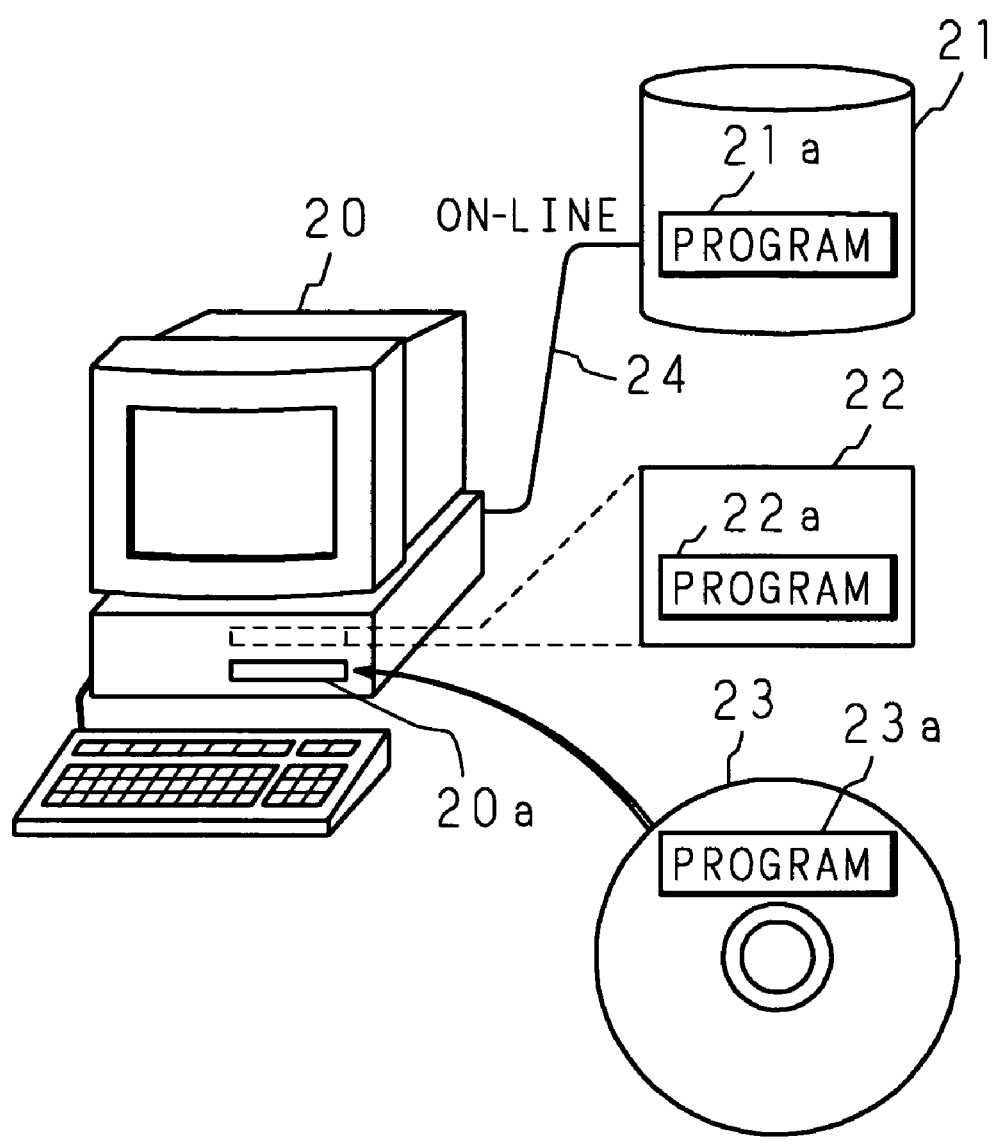
FIG. 5 is an illustration showing the structures of embodiments of a memory product.

Next, examples of a memory product and transmission medium of the present invention will be explained. FIG. 5 is an illustration showing the structures of embodiments of the memory product of the present invention. The programs exemplified here include a process for selecting a public key for each divided plaintext among a plurality of public keys stored in the database 6 (or 16) in advance, according to the data pattern of a plurality of divided plaintexts (or the bit data of each divided plaintext), and a process for generating ciphertext by using the selected public keys and divided plaintexts (or by using the selected public keys), or include a process for decrypting the ciphertext thus generated according to the above-described decryption algorithm, and are recorded in the memory product explained below. Besides, a computer 20 is provided for each entity.

In FIG. 5, a memory product 21 to be on-line connected to the computer 20 is constructed by, for example, a WWW (World Wide Web) server computer installed at a distant point from the installation position of the computer 20, and a program 21a as mentioned above is stored in the memory product 21. The program 21a read from the memory product 21 through a transmission medium 24 such as a communication line controls the computer 20 to generate the ciphertext C, or decrypt the ciphertext C into the original plaintext X.

A memory product 22 provided inside the computer 20 is constructed by, for example, a hard disk drive or ROM installed in the computer 20, and a program 22a as mentioned above is stored in the memory product 22. The program 22a read from the memory product 22 controls the computer 20 to generate the ciphertext C, or decrypt the ciphertext C into the original plaintext X.

A memory product 23 which is used by loading it in a disk drive 20a provided for the computer 20 is constructed by, for example, a portable magneto-optical disk, CD-ROM or flexible disk, and a program 23a as mentioned above is stored in the memory product 23. The program 23a read from the memory product 23 controls the computer 20 to generate the ciphertext C, or decrypt the ciphertext C into the original plaintext X.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An encryption method for generating a ciphertext from divided plaintexts obtained by dividing a plaintext to be encrypted, comprising the steps of:

dividing a plaintext to be encrypted into a plurality of 1-bit divided plaintexts;

selecting one public key for each divided plaintext among two public keys each of which includes therein a random number term and are prepared for each divided plaintext, according to a bit pattern of the plurality of divided plaintexts; and generating a ciphertext by using the plurality of divided plaintexts and selected public keys.

2. The encryption method as set forth in claim 1, wherein the ciphertext is generated by adding a plurality of products of the respective divided plaintexts and correspondingly selected public keys.

3. The encryption method as set forth in claim 1, wherein the ciphertext is generated by multiplying and/or adding a plurality of product-sum terms obtained by adding a plurality of products of the respective divided plaintexts and correspondingly selected public keys.

4. The encryption method as set forth in claim 1, wherein the ciphertext is generated by using a result of operating multi-stage modular-transformation by a plurality of random numbers on the selected public keys.

5. A cryptographic communication method for communicating information by a ciphertext between entities, comprising the steps of:
   dividing at a first entity a plaintext to be encrypted into a plurality of 1-bit divided plaintexts;
   selecting at the first entity one public key for each divided plaintext among two public keys each of which includes therein a random number term and are prepared for each divided plaintext, according to a bit pattern of the plurality of divided plaintexts;
   generating at the first entity a ciphertext by using the plurality of divided plaintexts and selected public keys and transferring the ciphertext to the second entity; and
   decrypting at the second entity the transferred ciphertext into a plaintext.

6. A cryptographic communication system for communicating information by a ciphertext between entities, comprising:
   an encryptor generating a ciphertext from a plaintext by using the encryption method of claim 1;
   a communication path transmitting the generated ciphertext from a first entity to a second entity; and
   a decryptor decrypting the transmitted ciphertext into a plaintext.

7. A device for generating a ciphertext by using divided plaintexts obtained by dividing a plaintext to be encrypted and public keys, comprising:
   a database storing two public keys each of which includes therein a random number term for each divided plaintext in advance;
   a divider dividing a plaintext to be encrypted into a plurality of 1-bit divided plaintexts;
   a selector selecting one public key for each divided plaintext among the two public keys, according to a bit pattern of the plurality of 1-bit divided plaintexts; and
   an encryptor generating a ciphertext by using the plurality of divided plaintexts and selected public keys.

8. A computer memory product having computer readable program code means for causing a computer to generate a ciphertext by using divided plaintexts obtained by dividing a plaintext to be encrypted and public keys, said computer readable program code means comprising:
   program code means for causing the computer to divide a plaintext to be encrypted into a plurality of 1-bit divided plaintexts;
   program code means for causing the computer to select one public key for each divided plaintext among two public keys each of which includes therein a random number term and are prepared for each divided plaintext, according to a bit pattern of the plurality of divided plaintexts; and
   program code means for causing the computer to generate a ciphertext by using the plurality of divided plaintexts and selected public keys.

9. A computer memory product having computer readable program code means for causing a computer to decrypt a ciphertext generated by using a plurality of 1-bit divided plaintexts obtained by dividing a plaintext and a plurality of public keys selected in such a manner that one public key is selected for each divided plaintext among two public keys each of which includes therein a random number term and are prepared for each divided plaintext, according to a bit pattern of the plurality of divided plaintexts, said computer readable program code means comprising:
   program code means for causing the computer to sequentially decrypt the divided plaintexts while identifying the selected public keys.

10. An encryption method for generating a ciphertext from divided plaintexts obtained by dividing a plaintext to be encrypted, comprising the steps of:
    dividing a plaintext to be encrypted into a plurality of s-bit (s: natural number) divided plaintexts;
    selecting one public key for each divided plaintext among $2^s$ public keys each of which includes therein a random number term and are prepared for each divided plaintext, according to bit data of each divided plaintext; and
    generating a ciphertext by using the selected public keys.

11. The encryption method as set forth in claim 10, wherein the ciphertext is generated by adding the selected public keys.

12. The encryption method as set forth in claim 10, wherein the ciphertext is generated by multiplying and/or adding a plurality of sum terms obtained by adding the selected public keys.

13. The encryption method as set forth in claim 10, wherein the ciphertext is generated by using a result of operating multi-stage modular-transformation by a plurality of random numbers on the selected public keys.

14. A cryptographic communication system for communicating information by a ciphertext between entities, comprising:
    an encryptor for generating a ciphertext from a plaintext by using the encryption method of claim 10;
    a communication path transmitting the generated ciphertext from a first entity to a second entity; and
    a decryptor decrypting the transmitted ciphertext into a plaintext.

15. A cryptographic communication method for communicating information by a ciphertext between entities, comprising the steps of:
    dividing at a first entity a plaintext to be encrypted into a plurality of s-bit (s: natural number) divided plaintexts;
    selecting at the first entity one public key for each divided plaintext among $2^s$ public keys each of which includes therein a random number term and are prepared for each divided plaintext, according to bit data of each divided plaintext;
    generating at the first entity a ciphertext by using the selected public keys and transferring the ciphertext to a second entity; and
    decrypting at the second entity the transferred ciphertext into a plaintext by the other entity.

16. A device for generating a ciphertext based on divided plaintexts obtained by dividing a plaintext to be encrypted and public keys, comprising:
    a database storing $2^s$ (s: natural number) public keys each of which includes therein a random number term for each divided plaintext in advance;
    a divider dividing a plaintext to be encrypted into a plurality of s-bit divided plaintexts;

a selector selecting one public key for each divided plaintext among the $2^s$ public keys, according to bit data of each divided plaintext; and an encryptor generating a ciphertext by using the selected public keys.

17. A computer memory product having computer readable program code means for causing a computer to generate a ciphertext based on divided plaintexts obtained by dividing a plaintext to be encrypted and public keys, said computer readable program code means comprising:

program code means for causing the computer to divide a plaintext to be encrypted into a plurality of s-bit (s: natural number) divided plaintexts;

program code means for causing the computer to select one public key for each divided plaintext among $2^s$ public keys each of which includes therein a random number term and are prepared for each divided plaintext, according to bit data of each divided plaintext; and program code means for causing the computer to generate a ciphertext by using the selected public keys.

18. A computer memory product having computer readable program code means for causing a computer to decrypt a ciphertext generated by using a plurality of public keys selected in such a manner that one public key is selected for each of a plurality of s-bit divided plaintexts obtained by dividing a plaintext among $2^s$(s: natural number) public keys each of which includes therein a random number term and are prepared for each divided plaintext, according to bit data of each divided plaintext, said computer readable program code means comprising:

program code means for causing the computer to sequentially decrypt the divided plaintexts while identifying the selected public keys.

\* \* \* \* \*